United States Patent
Khlat (10) Patent No.: US 10,069,618 B2
(45) Date of Patent: Sep. 4, 2018

(54) SINGLE RF PA CHAIN FOR CA FDD-TDD AND TDD TX

(71) Applicant: Qorvo US, Inc., Greensboro, NC (US)

(72) Inventor: Nadim Khlat, Cugnaux (FR)

(73) Assignee: Qorvo US, Inc., Greensboro, NC (US)

( * ) Notice: Subject to any disclaimer, the term of this patent is extended or adjusted under 35 U.S.C. 154(b) by 58 days.

(21) Appl. No.: 15/244,588

(22) Filed: Aug. 23, 2016

(65) Prior Publication Data

US 2017/0207813 A1 Jul. 20, 2017

Related U.S. Application Data

(60) Provisional application No. 62/278,603, filed on Jan. 14, 2016.

(51) Int. Cl.
*H04B 7/005* (2006.01)
*H04L 5/26* (2006.01)

(52) U.S. Cl.
CPC ..................... *H04L 5/26* (2013.01)

(58) Field of Classification Search
CPC .. H04L 5/26; H04L 29/06; H04B 1/60; H04B 1/56; H04W 28/04; H04W 88/06
See application file for complete search history.

(56) References Cited

U.S. PATENT DOCUMENTS

| | | | | |
|---|---|---|---|---|
| 7,333,831 B2* | 2/2008 | Srinivasan | ............ | H04B 1/006 330/295 |
| 8,280,389 B1* | 10/2012 | Turtinen | ............... | H04W 24/10 455/450 |
| 9,172,404 B1* | 10/2015 | Iversen | ................ | H04B 1/0082 |
| 9,621,312 B2* | 4/2017 | Li | ............................ | H04L 5/001 |
| 2005/0107043 A1* | 5/2005 | Avasarala | ................ | H04B 1/48 455/78 |
| 2005/0181770 A1* | 8/2005 | Helferich | ............ | H04M 1/7255 455/413 |
| 2005/0245201 A1* | 11/2005 | Ella | ........................ | H04B 1/005 455/78 |
| 2006/0035601 A1* | 2/2006 | Seo | .......................... | H04B 1/40 455/78 |
| 2006/0088120 A1* | 4/2006 | Hansen | ................ | H04B 7/0613 375/267 |
| 2007/0286115 A1* | 12/2007 | Shibuya | ................... | H04B 1/44 370/328 |
| 2008/0009248 A1* | 1/2008 | Rozenblit | ............. | H03F 1/0227 455/127.1 |

(Continued)

*Primary Examiner* — Steve D Agosta
(74) *Attorney, Agent, or Firm* — Withrow & Terranova, P.L.L.C.

(57) ABSTRACT

RF circuitry, which includes RF RX circuitry, an RF PA, RF TDD switching circuitry, and RF TX switching circuitry, is disclosed. The RF TX switching circuitry is coupled between the RF PA and the RF TDD switching circuitry. The RF PA receives and amplifies an RF input signal to provide an RF TX signal. During a first CA FDD-TDD operating mode, the RF TX signal has a first FDD TX carrier frequency, the RF TDD switching circuitry forwards a first filtered RF TDD RX signal to the RF RX circuitry, and the RF TX switching circuitry provides isolation between the RF PA and the RF TDD switching circuitry. During a first TDD TX operating mode, the RF TX signal has a first TDD TX carrier frequency and the RF TX switching circuitry forwards the RF TX signal to the RF TDD switching circuitry.

18 Claims, 5 Drawing Sheets

(56) References Cited

U.S. PATENT DOCUMENTS

| | | | | |
|---|---|---|---|---|
| 2008/0198776 A1* | 8/2008 | Seo | ............ | H04B 1/48 370/280 |
| 2010/0189031 A1* | 7/2010 | Kanou | ............ | H01Q 1/24 370/328 |
| 2011/0075593 A1* | 3/2011 | Chen | ............ | H04B 1/0057 370/280 |
| 2011/0210787 A1* | 9/2011 | Lee | ............ | H03F 1/56 330/126 |
| 2012/0243447 A1* | 9/2012 | Weissman | ............ | H04B 1/0458 370/280 |
| 2012/0327821 A1* | 12/2012 | Lin | ............ | H04W 72/048 370/280 |
| 2012/0329395 A1* | 12/2012 | Husted | ............ | H04B 1/406 455/41.2 |
| 2013/0273861 A1* | 10/2013 | See | ............ | H04B 1/44 455/83 |
| 2014/0112213 A1* | 4/2014 | Norholm | ............ | H04B 1/56 370/277 |
| 2015/0063509 A1* | 3/2015 | Hedayati | ............ | H04B 15/005 375/350 |
| 2015/0155892 A1* | 6/2015 | Haase | ............ | H01Q 1/22 455/129 |
| 2015/0349907 A1* | 12/2015 | Narathong | ............ | H04J 4/00 370/280 |
| 2016/0050665 A1* | 2/2016 | Chang | ............ | H04L 5/14 370/280 |
| 2016/0095152 A1* | 3/2016 | McDonnell | ............ | H04L 5/001 370/294 |
| 2016/0134414 A1* | 5/2016 | Pehlke | ............ | H04B 1/0057 370/280 |

\* cited by examiner

SINGLE RF PA CHAIN FOR CA FDD-TDD AND TDD TX

RELATED APPLICATIONS

The present application claims priority to U.S. provisional patent application No. 62/278,603, filed Jan. 14, 2016, and is hereby incorporated herein by reference in its entirety.

FIELD OF THE DISCLOSURE

Embodiments of the present disclosure relate to radio frequency (RF) communications systems, which may include RF front-end circuitry, RF transceiver circuitry, RF transmit circuitry, RF receive circuitry, RF diplexers, RF duplexers, RF filters, RF antennas, RF switches, RF combiners, RF splitters, the like, or any combination thereof.

BACKGROUND

As wireless communications technologies evolve, wireless communications systems become increasingly sophisticated. As such, wireless communications protocols continue to expand and change to take advantage of the technological evolution. As a result, to maximize flexibility, many wireless communications devices must be capable of supporting any number of wireless communications protocols, each of which may have certain performance requirements, such as specific out-of-band emissions requirements, linearity requirements, or the like. Further, portable wireless communications devices are typically battery powered and need to be relatively small, and have low cost. As such, to minimize size, cost, and power consumption, RF circuitry in such a device needs to be as simple, small, flexible, and efficient as is practical. Thus, there is a need for RF circuitry in a communications device that is low cost, small, simple, flexible, and efficient.

SUMMARY

RF circuitry, which includes RF RX circuitry, an RF PA, RF TDD switching circuitry, and RF TX switching circuitry, is disclosed according to one embodiment of the present disclosure. The RF circuitry operates in one of a group of operating modes, which includes a first CA FDD-TDD operating mode and a first TDD TX operating mode. The RF TX switching circuitry is coupled between the RF PA and the RF TDD switching circuitry. The RF PA receives and amplifies an RF input signal to provide an RF TX signal. During the first CA FDD-TDD operating mode, the RF TX signal has a first FDD TX carrier frequency, the RF TDD switching circuitry forwards a first filtered RF TDD RX signal to the RF RX circuitry, and the RF TX switching circuitry provides isolation between the RF PA and the RF TDD switching circuitry. During the first TDD TX operating mode, the RF TX signal has a first TDD TX carrier frequency and the RF TX switching circuitry forwards the RF TX signal to the RF TDD switching circuitry.

In one embodiment of the RF circuitry, during the first CA FDD-TDD operating mode; the RF TDD switching circuitry provides isolation between the RF TX switching circuitry and the RF RX circuitry that is greater than 30 decibels (db), and the RF TX switching circuitry provides isolation between the RF PA and the RF TDD switching circuitry that is greater than 30 db. As such, RX sensitivity of the RF circuitry during the first CA FDD-TDD operating mode may be increased.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

Certain acronyms and abbreviations are used in the present disclosure and claims for clarity and simplification. Such acronyms include radio frequency (RF), receive (RX), transmit (TX), power amplifier (PA), time-division duplexing (TDD), frequency-division duplexing (FDD), and carrier aggregation (CA).

RF circuitry, which includes RF RX circuitry, an RF PA, RF TDD switching circuitry, and RF TX switching circuitry, is disclosed according to one embodiment of the present disclosure. The RF circuitry operates in one of a group of operating modes, which includes a first CA FDD-TDD operating mode and a first TDD TX operating mode. The RF TX switching circuitry is coupled between the RF PA and the RF TDD switching circuitry. The RF PA receives and amplifies an RF input signal to provide an RF TX signal. During the first CA FDD-TDD operating mode, the RF TX signal has a first FDD TX carrier frequency, the RF TDD switching circuitry forwards a first filtered RF TDD RX signal to the RF RX circuitry, and the RF TX switching circuitry provides isolation between the RF PA and the RF TDD switching circuitry. During the first TDD TX operating mode, the RF TX signal has a first TDD TX carrier frequency and the RF TX switching circuitry forwards the RF TX signal to the RF TDD switching circuitry.

In one embodiment of the RF circuitry, during the first CA FDD-TDD operating mode; the RF TDD switching circuitry provides isolation between the RF TX switching circuitry and the RF RX circuitry that is greater than 30 decibels (db), and the RF TX switching circuitry provides isolation between the RF PA and the RF TDD switching circuitry that is greater than 30 db. As such, RX sensitivity of the RF circuitry during the first CA FDD-TDD operating mode may be increased.

Figure 1:
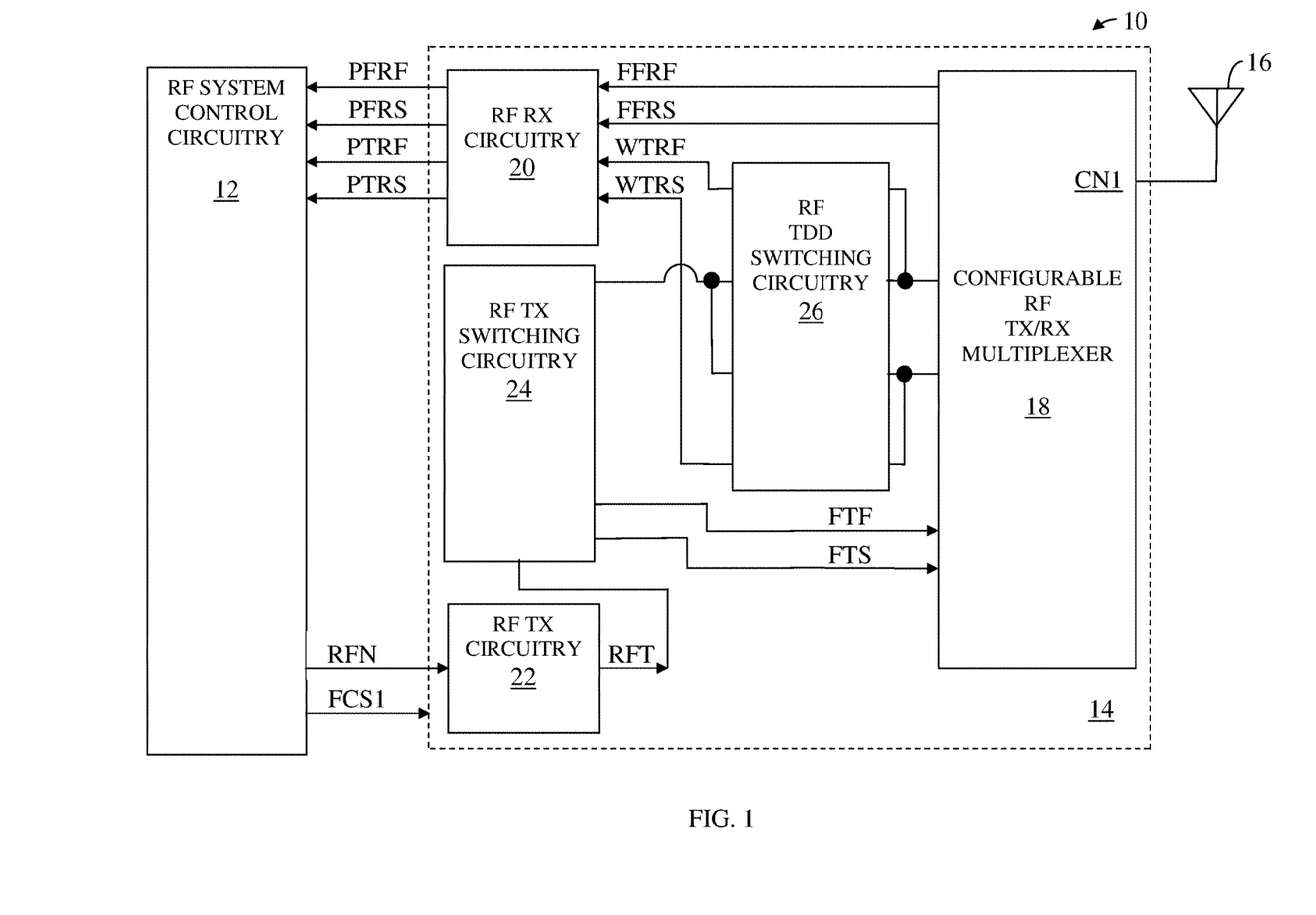
FIG. 1 shows RF communications circuitry according to one embodiment of the RF communications circuitry.

FIG. 1 shows RF communications circuitry 10 according to one embodiment of the RF communications circuitry 10. The RF communications circuitry 10 includes RF system control circuitry 12, RF front-end circuitry 14, and a first RF antenna 16. The RF front-end circuitry 14 includes a configurable RF TX/RX multiplexer 18, RF RX circuitry 20, RF TX circuitry 22, RF TX switching circuitry 24, and RF TDD switching circuitry 26. The configurable RF TX/RX multiplexer 18 has a first common connection node CN1, which is coupled to the first RF antenna 16. In one embodiment of the configurable RF TX/RX multiplexer 18, the first common connection node CN1 is directly coupled to the first RF antenna 16.

In one embodiment of the RF system control circuitry 12, the RF system control circuitry 12 provides a first function configuration signal FCS1 to any or all of the configurable RF TX/RX multiplexer 18, the RF RX circuitry 20, the RF TX circuitry 22, the RF TX switching circuitry 24, and the RF TDD switching circuitry 26. As such, in one embodiment of the RF system control circuitry 12 and the RF front-end circuitry 14, the RF system control circuitry 12 configures any or all of the configurable RF TX/RX multiplexer 18, the RF RX circuitry 20, the RF TX circuitry 22, the RF TX switching circuitry 24, and the RF TDD switching circuitry 26 using the first function configuration signal FCS1.

Figure 5:
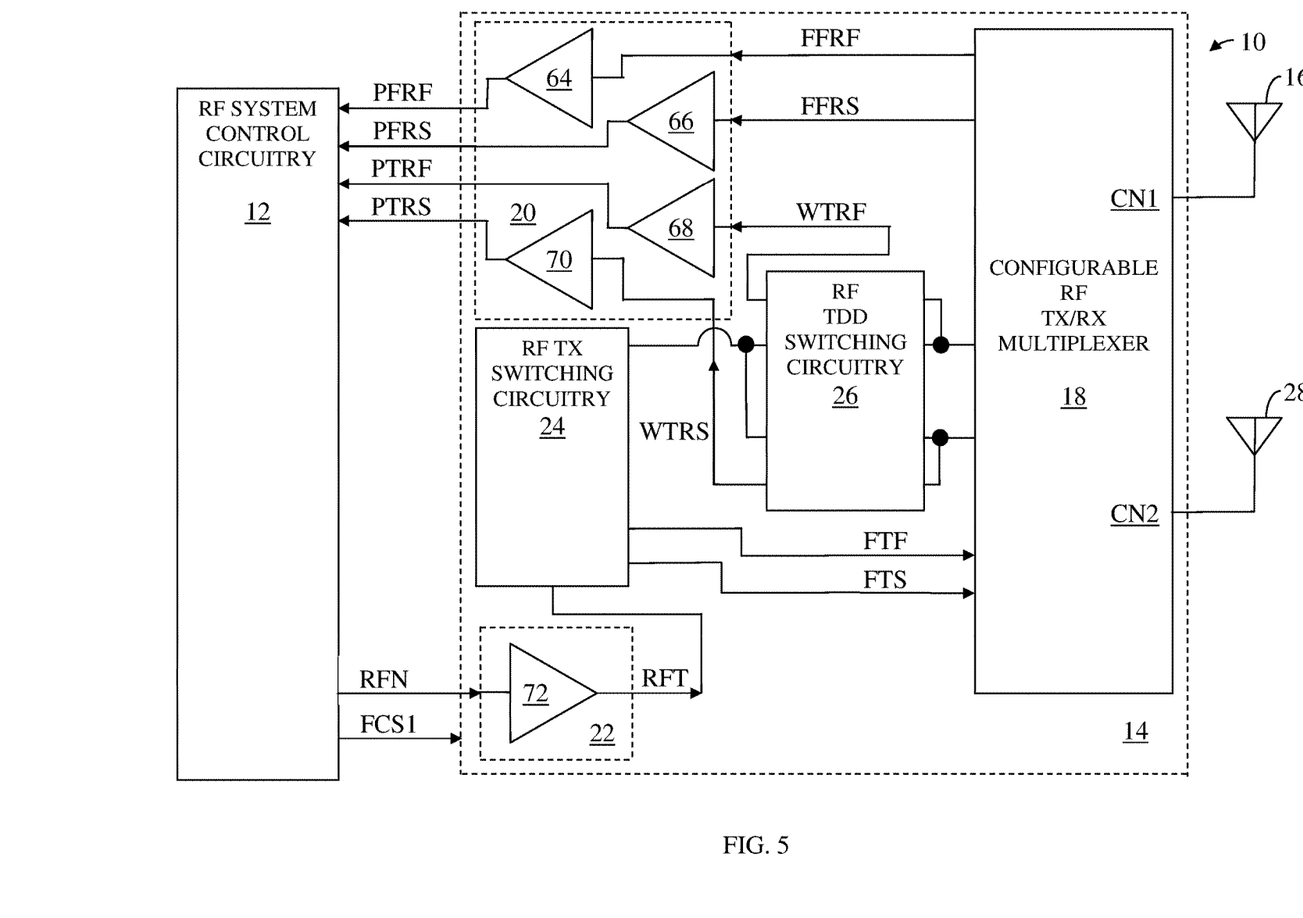
FIG. 5 shows the RF communications circuitry according to another embodiment of the RF communications circuitry.

In one embodiment of the RF system control circuitry 12 and the RF TX circuitry 22, the RF system control circuitry 12 provides an RF input signal RFN to the RF TX circuitry 22, which receives and processes the RF input signal RFN to provide an RF TX signal RFT to the RF TX switching circuitry 24. In one embodiment of the RF TX circuitry 22, the RF TX circuitry 22 includes an RF PA 72 (FIG. 5), which receives and amplifies the RF input signal RFN to provide the RF TX signal RFT. In one embodiment of the RF front-end circuitry 14, the RF PA 72 (FIG. 5) provides a single RF PA chain, such that all RF TX signals that are transmitted via the RF front-end circuitry 14 are provided from the RF PA 72 (FIG. 5).

In one embodiment of the RF front-end circuitry 14, the RF TX switching circuitry 24 is coupled between the RF TX circuitry 22 and the RF TDD switching circuitry 26; the RF TX switching circuitry 24 is further coupled between the RF TX circuitry 22 and the configurable RF TX/RX multiplexer 18; the RF TDD switching circuitry 26 is coupled between the RF TX switching circuitry 24 and the configurable RF TX/RX multiplexer 18; and the RF TDD switching circuitry 26 is further coupled between the RF RX circuitry 20 and the configurable RF TX/RX multiplexer 18. In one embodiment of the RF front-end circuitry 14, the RF TX switching circuitry 24 is coupled between the RF PA 72 (FIG. 5) and the RF TDD switching circuitry 26.

In one embodiment of the RF front-end circuitry 14, the RF TX switching circuitry 24 forwards the RF TX signal RFT to provide a first RF FDD TX signal FTF to the configurable RF TX/RX multiplexer 18, which receives, filters, and transmits the first RF TDD TX signal FTF via the first RF antenna 16. In an alternate embodiment of the RF front-end circuitry 14, the RF TX switching circuitry 24 forwards the RF TX signal RFT to provide a second RF FDD TX signal FTS to the configurable RF TX/RX multiplexer 18, which receives, filters, and transmits the second RF TDD TX signal FTS via the first RF antenna 16.

In one embodiment of the RF TX circuitry 22, the RF TX circuitry 22 includes up-conversion circuitry, amplification circuitry, power supply circuitry, filtering circuitry, switching circuitry, combining circuitry, splitting circuitry, dividing circuitry, clocking circuitry, the like, or any combination thereof to process the RF input signal RFN.

In one embodiment of the RF front-end circuitry 14, the configurable RF TX/RX multiplexer 18 receives and filters an RF receive signal via the first RF antenna 16 to provide a first filtered RF FDD RX signal FFRF to the RF RX circuitry 20, which processes the first filtered RF FDD RX signal FFRF to provide a first processed RF FDD RX signal PFRF to the RF system control circuitry 12. In one embodiment of the RF front-end circuitry 14, the configurable RF TX/RX multiplexer 18 receives and filters an RF receive signal via the first RF antenna 16 to provide a second filtered RF FDD RX signal FFRS to the RF RX circuitry 20, which processes the second filtered RF FDD RX signal FFRS to provide a second processed RF FDD RX signal PFRS to the RF system control circuitry 12.

In one embodiment of the RF front-end circuitry 14, the configurable RF TX/RX multiplexer 18 receives and filters an RF receive signal via the first RF antenna 16 to provide a first forwarded RF TDD RX signal WTRF to the RF RX circuitry 20 via the RF TDD switching circuitry 26, such that the RF RX circuitry 20 processes the first forwarded RF TDD RX signal WTRF to provide a first processed RF TDD RX signal PTRF to the RF system control circuitry 12. In one embodiment of the RF front-end circuitry 14, the configurable RF TX/RX multiplexer 18 receives and filters an RF receive signal via the first RF antenna 16 to provide a second forwarded RF TDD RX signal WTRS to the RF RX circuitry 20 via the RF TDD switching circuitry 26, such that the RF RX circuitry 20 processes the second forwarded RF TDD RX signal WTRS to provide a second processed RF TDD RX signal PTRS to the RF system control circuitry 12.

In one embodiment of the RF RX circuitry 20, the RF RX circuitry 20 includes down-conversion circuitry, amplification circuitry, low noise amplification circuitry, power supply circuitry, filtering circuitry, switching circuitry, combining circuitry, splitting circuitry, dividing circuitry, clocking circuitry, the like, or any combination thereof.

In an alternate embodiment of the RF front-end circuitry 14, any or all of the configurable RF TX/RX multiplexer 18, the RF RX circuitry 20, the RF TX circuitry 22, the RF TX switching circuitry 24, and the RF TDD switching circuitry 26 are omitted. In one embodiment of the RF system control circuitry 12, the RF system control circuitry 12 provides the first function configuration signal FCS1 to any or all of the configurable RF TX/RX multiplexer 18, the RF RX circuitry 20, the RF TX circuitry 22, the RF TX switching circuitry 24, and the RF TDD switching circuitry 26. As such, the RF system control circuitry 12 may configure, tune, adjust, enable, disable, vary, or any combination thereof, circuits within the configurable RF TX/RX multiplexer 18, the RF RX circuitry 20, the RF TX circuitry 22, the RF TX switching circuitry 24, the RF TDD switching circuitry 26, or any combination thereof, as necessary using the first function configuration signal FCS1.

Figure 2:
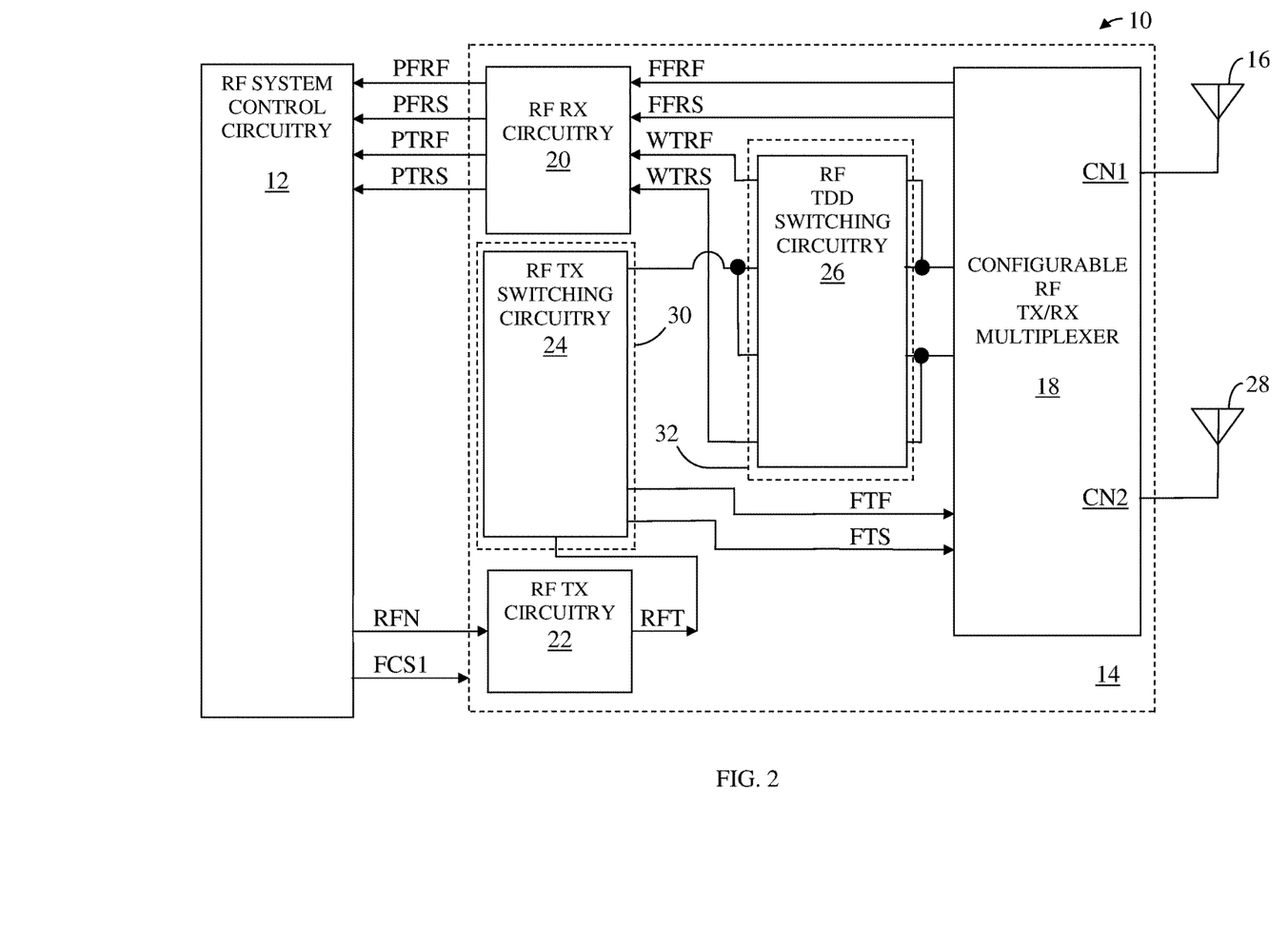
FIG. 2 shows the RF communications circuitry according to an alternate embodiment of the RF communications circuitry.

FIG. 2 shows the RF communications circuitry 10 according to an alternate embodiment of the RF communications circuitry 10. The RF communications circuitry 10 illustrated in FIG. 2 is similar to the RF communications circuitry 10 illustrated in FIG. 1, except the RF communications circuitry 10 illustrated in FIG. 2 further includes a second RF antenna 28. Additionally, the configurable RF TX/RX multiplexer 18 further has a second common connection node CN2, which is coupled to the second RF antenna 28. In one embodiment of the configurable RF TX/RX multiplexer 18, the second common connection node CN2 is directly coupled to the second RF antenna 28.

In one embodiment of the RF front-end circuitry 14, the RF front-end circuitry 14 further includes a first switching circuitry die 30 and a second switching circuitry die 32. The first switching circuitry die 30 includes the RF TX switching circuitry 24 and the second switching circuitry die 32 includes the RF TDD switching circuitry 26.

Figure 3:
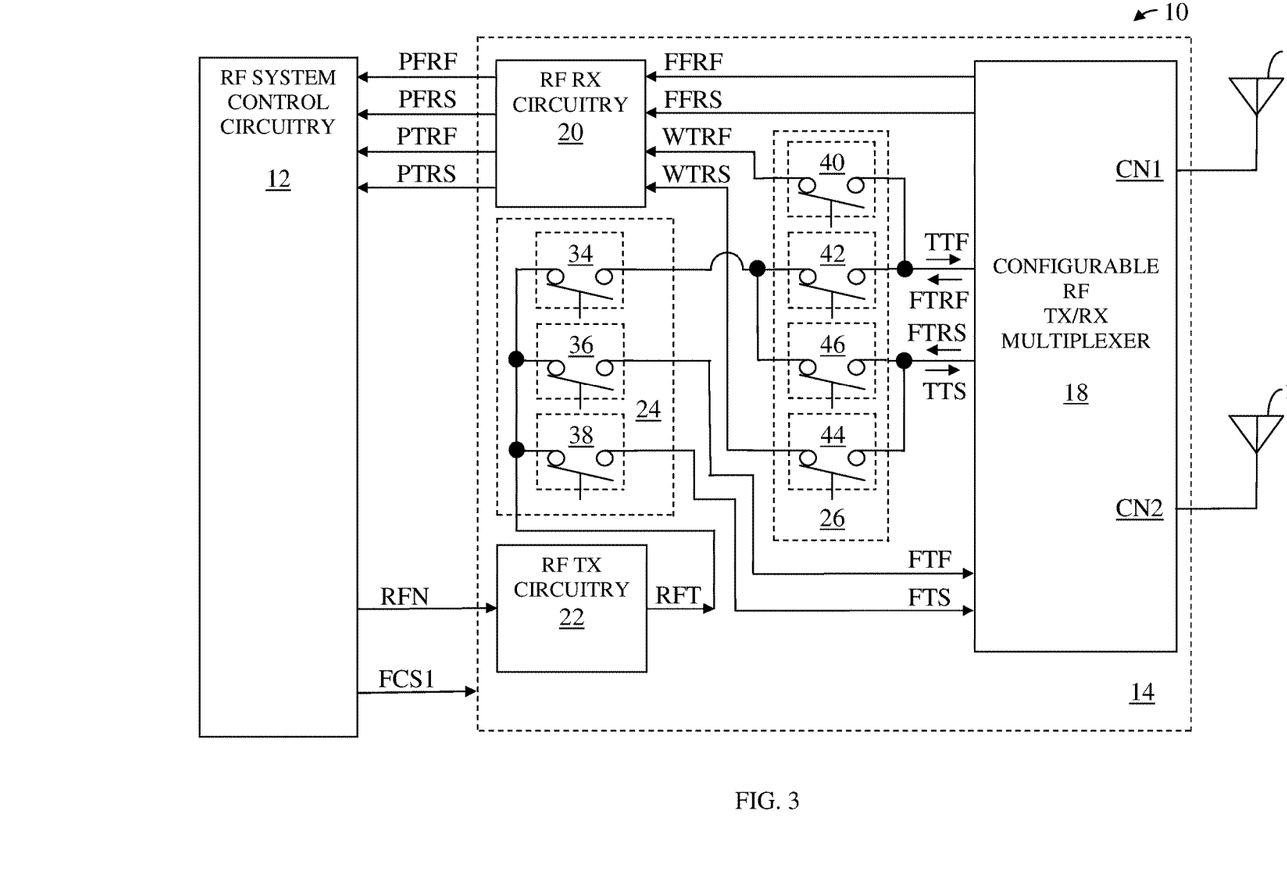
FIG. 3 shows the RF communications circuitry according to an additional embodiment of the RF communications circuitry.
Figure 4:
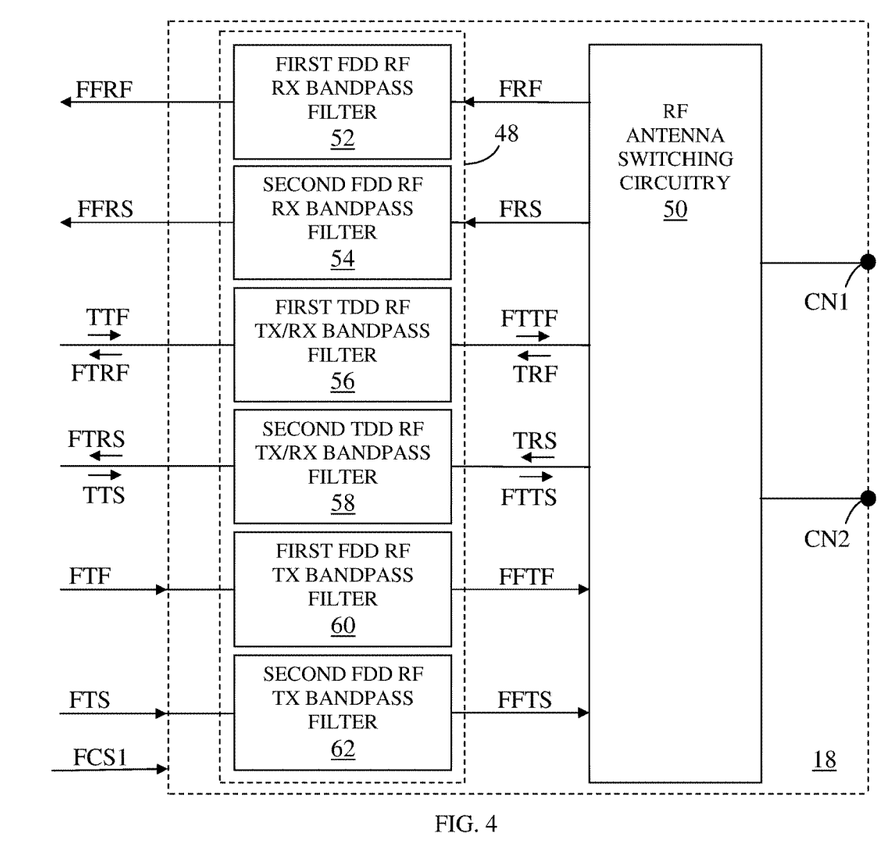
FIG. 4 shows details of a configurable RF TX/RX multiplexer illustrated in FIG. 3 according to one embodiment of the configurable RF TX/RX multiplexer.

FIG. 3 shows the RF communications circuitry 10 according to an additional embodiment of the RF communications circuitry 10. The RF communications circuitry 10 illustrated in FIG. 3 is similar to the RF communications circuitry 10 illustrated in FIG. 2, except in the RF communications circuitry 10 illustrated in FIG. 3, the first switching circuitry die 30 and the second switching circuitry die 32 are not shown to simplify FIG. 3. Further, details of the RF TX switching circuitry 24 and the RF TDD switching circuitry 26 are shown in FIG. 3. In one embodiment of the configurable RF TX/RX multiplexer 18 illustrated in FIG. 3, the configurable RF TX/RX multiplexer 18 includes RF bandpass filter circuitry 48 (FIG. 4).

The RF TX switching circuitry 24 includes a master TDD TX switching element 34, a first FDD TX switching element 36, and a second FDD TX switching element 38. In general, the RF TX switching circuitry 24 includes a group of FDD TX switching elements 36, 38. The RF TDD switching circuitry 26 includes a first TDD RX switching element 40, a first TDD TX switching element 42, a second TDD RX switching element 44, and a second TDD TX switching element 46. In general, the RF TDD switching circuitry 26 includes a group of TDD RX switching elements 40, 44 and a group of TDD TX switching elements 42, 46.

In one embodiment of the RF front-end circuitry 14, the first TDD RX switching element 40 is coupled between the configurable RF TX/RX multiplexer 18 and the RF RX circuitry 20. The second TDD RX switching element 44 is coupled between the configurable RF TX/RX multiplexer 18 and the RF RX circuitry 20. The first TDD TX switching element 42 is coupled between the configurable RF TX/RX multiplexer 18 and the master TDD TX switching element 34. The second TDD TX switching element 46 is coupled between the configurable RF TX/RX multiplexer 18 and the master TDD TX switching element 34. In general, the first TDD TX switching element 42 is coupled between the configurable RF TX/RX multiplexer 18 and the RF TX switching circuitry 24, and the second TDD TX switching element 46 is coupled between the configurable RF TX/RX multiplexer 18 and the RF TX switching circuitry 24.

In one embodiment of the RF front-end circuitry 14, the master TDD TX switching element 34 is coupled between the first TDD TX switching element 42 and the RF PA 72 (FIG. 5). The master TDD TX switching element 34 is coupled between the second TDD TX switching element 46 and the RF PA 72 (FIG. 5). In one embodiment of the RF front-end circuitry 14, the first FDD TX switching element 36 is coupled between the configurable RF TX/RX multiplexer 18 and the RF TX circuitry 22. The second FDD TX switching element 38 is coupled between the configurable RF TX/RX multiplexer 18 and the RF TX circuitry 22.

In one embodiment of the RF front-end circuitry 14, the first FDD TX switching element 36 is coupled between the configurable RF TX/RX multiplexer 18 and the RF PA 72 (FIG. 5). The second FDD TX switching element 38 is coupled between the configurable RF TX/RX multiplexer 18 and the RF PA 72 (FIG. 5).

In a general embodiment of the RF front-end circuitry 14, each of the group of TDD TX switching elements 42, 46 is coupled between the RF TX switching circuitry 24 and the RF bandpass filter circuitry 48 (FIG. 4). Each of the group of TDD RX switching elements 40, 44 is coupled between the RF RX circuitry 20 and the RF bandpass filter circuitry 48 (FIG. 4). The group of FDD TX switching elements 36, 38 is coupled between the RF PA 72 (FIG. 5) and the RF bandpass filter circuitry 48 (FIG. 4).

In one embodiment of the RF front-end circuitry 14, the first switching circuitry die 30 (FIG. 2) includes the group of FDD TX switching elements 36, 38 and the second switching circuitry die 32 (FIG. 2) includes the group of TDD RX switching elements 40, 44 and the group of TDD TX switching elements 42, 46. During TDD communications, the RF TDD switching circuitry 26 may be reconfigured when switching between TX operations and RX operations using one RF communications band. As such, the group of TDD RX switching elements 40, 44 and the group of TDD TX switching elements 42, 46 may be reconfigured frequently. In contrast, during FDD communications, the RF TX switching circuitry 24 may be reconfigured when switching between different communications bands or when switching between FDD and TDD operations. Therefore, the group of FDD TX switching elements 36, 38 may be reconfigured much less frequently than the group of TDD RX switching elements 40, 44 and the group of TDD TX switching elements 42, 46.

Therefore, a design life of each of the group of TDD RX switching elements 40, 44 and the group of TDD TX switching elements 42, 46 may be significantly greater than a design life of each of the group of FDD TX switching elements 36, 38. In this regard, in one embodiment of the RF front-end circuitry 14, each of the group of FDD TX switching elements 36, 38 has a design life of a first number of actuations, each of the group of TDD TX switching elements 42, 46 has a design life of a second number of actuations, and each of the group of TDD RX switching elements 40, 44 has a design life of a third number of actuations.

In one embodiment of the group of FDD TX switching elements 36, 38, the group of TDD TX switching elements 42, 46, and the group of TDD RX switching elements 40, 44, the second number of actuations is greater than ten times the first number of actuations and the third number of actuations is greater than ten times the first number of actuations.

In one embodiment of the group of FDD TX switching elements 36, 38, each of the group of FDD TX switching elements 36, 38 is a micro-electromechanical (MEMS) switching element. In one embodiment of the group of TDD RX switching elements 40, 44, each of the group of TDD RX switching elements 40, 44 is a silicon-on-insulator (SOI) switching element. In one embodiment of the group of TDD TX switching elements 42, 46, each of the group of TDD TX switching elements 42, 46 is an SOI switching element.

In one embodiment of the RF front-end circuitry 14, any of the master TDD TX switching element 34, the first FDD TX switching element 36, the second FDD TX switching element 38, the first TDD RX switching element 40, the first TDD TX switching element 42, the second TDD RX switching element 44, and the second TDD TX switching element 46 are omitted.

In one embodiment of the RF front-end circuitry 14, each of the master TDD TX switching element 34, the first FDD TX switching element 36, the second FDD TX switching element 38, the first TDD RX switching element 40, the first TDD TX switching element 42, the second TDD RX switching element 44, and the second TDD TX switching element 46 is in one of ON and OFF based on the first function configuration signal FCS1.

In one embodiment of the RF system control circuitry 12 and the RF front-end circuitry 14, the RF system control circuitry 12 selects the one of ON and OFF for each of the master TDD TX switching element 34, the first FDD TX switching element 36, the second FDD TX switching element 38, the first TDD RX switching element 40, the first TDD TX switching element 42, the second TDD RX switching element 44, and the second TDD TX switching element 46 using the first function configuration signal FCS1.

In one embodiment of the RF communications circuitry 10, the RF communications circuitry 10 operates in one of a group of operating modes. In one embodiment of the RF communications circuitry 10, the group of operating modes includes a group of TDD RX operating modes, a group of TDD TX operating modes, a group of CA FDD-TDD operating modes, a group of FDD operating modes, and a group of CA FDD operating modes.

In an alternate embodiment of the RF communications circuitry 10, any of the group of TDD RX operating modes, the group of TDD TX operating modes, the group of CA FDD-TDD operating modes, the group of FDD operating modes, and the group of CA FDD operating modes is omitted.

In one embodiment of the RF communications circuitry 10, the group of TDD RX operating modes includes a first TDD RX operating mode and a second TDD RX operating mode. In one embodiment of the RF communications circuitry 10, the group of TDD TX operating modes includes a first TDD TX operating mode and a second TDD TX operating mode. In one embodiment of the RF communications circuitry 10, the group of CA FDD-TDD operating modes includes a first CA FDD-TDD operating mode, a second CA FDD-TDD operating mode, a third CA FDD-TDD operating mode, and a fourth CA FDD-TDD operating mode.

In one embodiment of the RF communications circuitry 10, the group of FDD operating modes includes a first FDD operating mode and a second FDD operating mode. In one embodiment of the RF communications circuitry 10, the group of CA FDD operating modes includes a first CA FDD operating mode and a second CA FDD operating mode.

In an alternate embodiment of the RF communications circuitry 10, any of the first TDD RX operating mode, the second TDD RX operating mode, the first TDD TX operating mode, the second TDD TX operating mode, the first CA FDD-TDD operating mode, the second CA FDD-TDD operating mode, the third CA FDD-TDD operating mode, the fourth CA FDD-TDD operating mode, the first FDD operating mode, the second FDD operating mode, the first CA FDD operating mode, and the second CA FDD operating mode are omitted.

In one embodiment of the RF communications circuitry 10, during the first TDD RX operating mode; the master TDD TX switching element 34 is ON, the first FDD TX switching element 36 is OFF, the second FDD TX switching element 38 is OFF, the first TDD RX switching element 40 is ON, the first TDD TX switching element 42 is OFF, the second TDD RX switching element 44 is OFF, the second TDD TX switching element 46 is OFF, the configurable RF TX/RX multiplexer 18 receives and filters an RF receive signal via one of the first RF antenna 16 and the second RF antenna 28 to provide a first filtered RF TDD RX signal FTRF to the RF TDD switching circuitry 26, which provides the first forwarded RF TDD RX signal WTRF to the RF RX circuitry 20 via the first TDD RX switching element 40, and the first filtered RF TDD RX signal FTRF has a has a first TDD RX carrier frequency between 2300 megahertz and 2400 megahertz. By keeping the master TDD TX switching element 34 ON during both the first TDD RX operating mode and the first TDD TX operating mode, the RF communications circuitry 10 may toggle between the first TDD RX operating mode and the first TDD TX operating mode without transitioning the master TDD TX switching element 34, thereby reducing switching cycles of the master TDD TX switching element 34.

In one embodiment of the RF communications circuitry 10, during the second TDD RX operating mode; the master TDD TX switching element 34 is ON, the first FDD TX switching element 36 is OFF, the second FDD TX switching element 38 is OFF, the first TDD RX switching element 40 is OFF, the first TDD TX switching element 42 is OFF, the second TDD RX switching element 44 is ON, the second TDD TX switching element 46 is OFF, the configurable RF TX/RX multiplexer 18 receives and filters an RF receive signal via one of the first RF antenna 16 and the second RF antenna 28 to provide a second filtered RF TDD RX signal FTRS to the RF TDD switching circuitry 26, which provides the second forwarded RF TDD RX signal WTRS to the RF RX circuitry 20 via the second TDD RX switching element 44, and the second filtered RF TDD RX signal FTRS has a second TDD RX carrier frequency between 2496 megahertz and 2690 megahertz. By keeping the master TDD TX switching element 34 ON during both the second TDD RX operating mode and the second TDD TX operating mode, the RF communications circuitry 10 may toggle between the second TDD RX operating mode and the second TDD TX operating mode without transitioning the master TDD TX switching element 34, thereby reducing switching cycles of the master TDD TX switching element 34.

In one embodiment of the RF communications circuitry 10, during the first TDD TX operating mode, the master TDD TX switching element 34 is ON, the first FDD TX switching element 36 is OFF, the second FDD TX switching element 38 is OFF, the first TDD RX switching element 40 is OFF, the first TDD TX switching element 42 is ON, the second TDD RX switching element 44 is OFF, the second TDD TX switching element 46 is OFF, the RF TX signal RFT has a first TDD TX carrier frequency between 2300 megahertz and 2400 megahertz, the RF TX switching circuitry 24 forwards the RF TX signal RFT to the RF TDD switching circuitry 26, the RF TDD switching circuitry 26 provides a first RF TDD TX signal TTF to the configurable RF TX/RX multiplexer 18 based on the RF TX signal RFT, and the configurable RF TX/RX multiplexer 18 receives, filters, and transmits the first RF TDD TX signal TTF via an RF antenna, which is a selected one of the first RF antenna 16 and the second RF antenna 28.

In one embodiment of the RF communications circuitry 10, during the second TDD TX operating mode, the master TDD TX switching element 34 is ON, the first FDD TX switching element 36 is OFF, the second FDD TX switching element 38 is OFF, the first TDD RX switching element 40 is OFF, the first TDD TX switching element 42 is OFF, the second TDD RX switching element 44 is OFF, the second TDD TX switching element 46 is ON, the RF TX signal RFT has a second TDD TX carrier frequency between 2496 megahertz and 2690 megahertz, the RF TX switching circuitry 24 forwards the RF TX signal RFT to the RF TDD switching circuitry 26, the RF TDD switching circuitry 26 provides a second RF TDD TX signal TTS to the configurable RF TX/RX multiplexer 18 based on the RF TX signal RFT, and the configurable RF TX/RX multiplexer 18 receives, filters, and transmits the second RF TDD TX signal TTS via an RF antenna, which is a selected one of the first RF antenna 16 and the second RF antenna 28.

In one embodiment of the RF communications circuitry 10, during the first CA FDD-TDD operating mode; the master TDD TX switching element 34 is OFF, the first FDD TX switching element 36 is ON, the second FDD TX switching element 38 is OFF, the first TDD RX switching element 40 is ON, the first TDD TX switching element 42 is OFF, the second TDD RX switching element 44 is OFF, the second TDD TX switching element 46 is OFF, the RF TX signal RFT has a first FDD TX carrier frequency between 2500 megahertz and 2570 megahertz, the configurable RF TX/RX multiplexer 18 receives and filters a first RF receive signal via one of the first RF antenna 16 and the second RF antenna 28 to provide the first filtered RF TDD RX signal FTRF to the RF TDD switching circuitry 26, which provides the first forwarded RF TDD RX signal WTRF to the RF RX circuitry 20 via the first TDD RX switching element 40.

In one embodiment of the RF communications circuitry 10, during the first CA FDD-TDD operating mode; the first filtered RF TDD RX signal FTRF has a first TDD RX carrier frequency between 2300 megahertz and 2400 megahertz, the configurable RF TX/RX multiplexer 18 receives and filters a second RF receive signal via one of the first RF antenna 16 and the second RF antenna 28 to provide the first filtered RF FDD RX signal FFRF to the RF RX circuitry 20, the first filtered RF FDD RX signal FFRF has a first FDD RX carrier frequency between 2620 megahertz and 2690 megahertz, the RF TX switching circuitry 24 provides the first RF FDD TX signal FTF to the configurable RF TX/RX multiplexer 18 based on the RF TX signal RFT, and the configurable RF TX/RX multiplexer 18 receives, filters, and transmits the first RF FDD TX signal FTF via an RF antenna, which is one of the first RF antenna 16 and the second RF antenna 28.

In one embodiment of the RF communications circuitry 10, during the first CA FDD-TDD operating mode; the RF TX switching circuitry 24 provides isolation between the RF PA 72 (FIG. 5) and the RF TDD switching circuitry 26, the isolation between the RF PA 72 (FIG. 5) and the RF TDD switching circuitry 26 is greater than 30 decibels (db). In one embodiment of the RF communications circuitry 10; during the first CA FDD-TDD operating mode, the RF TDD switching circuitry 26 provides isolation between the RF TX switching circuitry 24 and the RF RX circuitry 20, and the RF communications circuitry 10 provides RX downlink carrier aggregation (RXDLCA), such that the first filtered RF FDD RX signal FFRF and the first filtered RF TDD RX signal FTRF are received simultaneously. In one embodiment of the RF communications circuitry 10, the isolation between the RF TX switching circuitry 24 and the RF RX circuitry 20 is greater than 30 db.

In one embodiment of the RF communications circuitry 10, during the second CA FDD-TDD operating mode, the master TDD TX switching element 34 is OFF, the first FDD TX switching element 36 is ON, the second FDD TX switching element 38 is OFF, the first TDD RX switching element 40 is OFF, the first TDD TX switching element 42 is OFF, the second TDD RX switching element 44 is ON, the second TDD TX switching element 46 is OFF, the RF TX signal RFT has the first FDD TX carrier frequency between 2500 megahertz and 2570 megahertz, the configurable RF TX/RX multiplexer 18 receives and filters a first RF receive signal via one of the first RF antenna 16 and the second RF antenna 28 to provide the second filtered RF TDD RX signal FTRS to the RF TDD switching circuitry 26, which provides the second forwarded RF TDD RX signal WTRS to the RF RX circuitry 20 via the second TDD RX switching element 44.

In one embodiment of the RF communications circuitry 10, during the second CA FDD-TDD operating mode, the configurable RF TX/RX multiplexer 18 receives and filters a second RF receive signal via one of the first RF antenna 16 and the second RF antenna 28 to provide the second filtered RF FDD RX signal FFRS to the RF RX circuitry 20, the RF TX switching circuitry 24 provides the first RF FDD TX signal FTF to the configurable RF TX/RX multiplexer 18 based on the RF TX signal RFT, and the configurable RF TX/RX multiplexer 18 receives, filters, and transmits the first RF FDD TX signal FTF via an RF antenna, which is one of the first RF antenna 16 and the second RF antenna 28.

In one embodiment of the RF communications circuitry 10, during the third CA FDD-TDD operating mode, the master TDD TX switching element 34 is OFF, the first FDD TX switching element 36 is OFF, the second FDD TX switching element 38 is ON, the first TDD RX switching element 40 is ON, the first TDD TX switching element 42 is OFF, the second TDD RX switching element 44 is OFF, the second TDD TX switching element 46 is OFF, the RF TX signal RFT has a second FDD TX carrier frequency between 2305 megahertz and 2315 megahertz, the configurable RF TX/RX multiplexer 18 receives and filters a first RF receive signal via one of the first RF antenna 16 and the second RF antenna 28 to provide the first filtered RF TDD RX signal FTRF to the RF TDD switching circuitry 26, which provides the first forwarded RF TDD RX signal WTRF to the RF RX circuitry 20 via the first TDD RX switching element 40.

In one embodiment of the RF communications circuitry 10, during the fourth CA FDD-TDD operating mode, the master TDD TX switching element 34 is OFF, the first FDD TX switching element 36 is OFF, the second FDD TX switching element 38 is ON, the first TDD RX switching element 40 is OFF, the first TDD TX switching element 42 is OFF, the second TDD RX switching element 44 is ON, the second TDD TX switching element 46 is OFF, and the RF TX signal RFT has the second FDD TX carrier frequency between 2305 megahertz and 2315 megahertz.

In one embodiment of the RF communications circuitry 10, during the first FDD operating mode, the master TDD TX switching element 34 is OFF, the first FDD TX switching element 36 is ON, the second FDD TX switching element 38 is OFF, the first TDD RX switching element 40 is OFF, the first TDD TX switching element 42 is OFF, the second TDD RX switching element 44 is OFF, the second TDD TX switching element 46 is OFF, the RF TX signal RFT has the first FDD TX carrier frequency between 2500 megahertz and 2570 megahertz In one embodiment of the RF communications circuitry 10, during the second FDD operating mode, the master TDD TX switching element 34 is OFF, the first FDD TX switching element 36 is OFF, the second FDD TX switching element 38 is ON, the first TDD RX switching element 40 is OFF, the first TDD TX switching element 42 is OFF, the second TDD RX switching element 44 is OFF, the second TDD TX switching element 46 is OFF, the RF TX signal RFT has the second FDD TX carrier frequency between 2305 megahertz and 2315 megahertz In one embodiment of the RF communications circuitry 10, during the first CA FDD operating mode, the master TDD TX switching element 34 is OFF, the first FDD TX switching element 36 is ON, the second FDD TX switching element 38 is OFF, the first TDD RX switching element 40 is OFF, the first TDD TX switching element 42 is OFF, the second TDD RX switching element 44 is OFF, the second TDD TX switching element 46 is OFF, the RF TX signal RFT has the first FDD TX carrier frequency between 2500 megahertz and 2570 megahertz In one embodiment of the RF communications circuitry 10, during the second CA FDD operating mode, the master TDD TX switching element 34 is OFF, the first FDD TX switching element 36 is OFF, the second FDD TX switching element 38 is ON, the first TDD RX switching element 40 is OFF, the first TDD TX switching element 42 is OFF, the second TDD RX switching element 44 is OFF, the second TDD TX switching element 46 is OFF, the RF TX signal RFT has the second FDD TX carrier frequency between 2305 megahertz and 2315 megahertz FIG. 4 shows details of the configurable RF TX/RX multiplexer 18 illustrated in FIG. 3 according to one embodiment of the configurable RF TX/RX multiplexer 18. The configurable RF TX/RX multiplexer 18 has the first common connection node CN1 and the second common connection node CN2 and includes RF bandpass filter circuitry 48 and RF antenna switching circuitry 50. In one embodiment of the RF bandpass filter circuitry 48, the RF bandpass filter circuitry 48 includes a first FDD RF RX bandpass filter 52, a second FDD RF RX bandpass filter 54, a first TDD RF TX/RX bandpass filter 56, a second TDD RF TX/RX bandpass filter 58, a first FDD RF TX bandpass filter 60, and a second FDD RF TX bandpass filter 62. In an alternate embodiment of the RF bandpass filter circuitry 48, any of the first FDD RF RX bandpass filter 52, the second FDD RF RX bandpass filter 54, the first TDD RF TX/RX bandpass filter 56, the second TDD RF TX/RX bandpass filter 58, the first FDD RF TX bandpass filter 60, and the second FDD RF TX bandpass filter 62 are omitted.

In one embodiment of the RF system control circuitry 12 (FIG. 3) and the configurable RF TX/RX multiplexer 18, the RF system control circuitry 12 (FIG. 3) configures the configurable RF TX/RX multiplexer 18 using the first function configuration signal FCS1. In one embodiment of the RF system control circuitry 12 (FIG. 3) and the RF bandpass filter circuitry 48, the RF system control circuitry 12 (FIG. 3) tunes any or all of the first FDD RF RX bandpass filter 52, the second FDD RF RX bandpass filter 54, the first TDD RF TX/RX bandpass filter 56, the second TDD RF TX/RX bandpass filter 58, the first FDD RF TX bandpass filter 60, and the second FDD RF TX bandpass filter 62 using the first function configuration signal FCS1.

In one embodiment of the RF system control circuitry 12 (FIG. 3) and the RF antenna switching circuitry 50, the RF system control circuitry 12 (FIG. 3) configures the RF antenna switching circuitry 50 using the first function configuration signal FCS1. As such, the RF antenna switching circuitry 50 forwards a first RF FDD RX signal FRF from a selected one of the first common connection node CN1 and the second common connection node CN2 based on the first function configuration signal FCS1. The RF antenna switching circuitry 50 forwards a second RF FDD RX signal FRS from a selected one of the first common connection node CN1 and the second common connection node CN2 based on the first function configuration signal FCS1.

The RF antenna switching circuitry 50 forwards a first RF TDD RX signal TRF from a selected one of the first common connection node CN1 and the second common connection node CN2 based on the first function configuration signal FCS1. The RF antenna switching circuitry 50 forwards a second RF TDD RX signal TRS from a selected one of the first common connection node CN1 and the second common connection node CN2 based on the first function configuration signal FCS1.

In one embodiment of the RF bandpass filter circuitry 48, the first FDD RF RX bandpass filter 52 receives and filters the first RF FDD RX signal FRF to provide the first filtered RF FDD RX signal FFRF. In one embodiment of the RF bandpass filter circuitry 48, the second FDD RF RX bandpass filter 54 receives and filters the second RF FDD RX signal FRS to provide the second filtered RF FDD RX signal FFRS. In one embodiment of the RF bandpass filter circuitry 48, the first TDD RF TX/RX bandpass filter 56 receives and filters the first RF TDD RX signal TRF to provide the first filtered RF TDD RX signal FTRF. In one embodiment of the RF bandpass filter circuitry 48, the second TDD RF TX/RX bandpass filter 58 receives and filters the second RF TDD RX signal TRS to provide the second filtered RF TDD RX signal FTRS.

In one embodiment of the RF bandpass filter circuitry 48, during the first CA FDD-TDD operating mode, the first TDD RF TX/RX bandpass filter 56 receives and filters an RF receive signal via an RF antenna and one of the first common connection node CN1 and the second common connection node CN2 to provide the first filtered RF TDD RX signal FTRF. In one embodiment of the RF bandpass filter circuitry 48, during the second CA FDD-TDD operating mode, the second TDD RF TX/RX bandpass filter 58 receives and filters an RF receive signal via an RF antenna and one of the first common connection node CN1 and the second common connection node CN2 to provide the second filtered RF TDD RX signal FTRS.

In one embodiment of the RF bandpass filter circuitry 48, the first TDD RF TX/RX bandpass filter 56 receives and filters the first RF TDD TX signal TTF to provide a first filtered RF TDD TX signal FTTF. In one embodiment of the RF bandpass filter circuitry 48, the second TDD RF TX/RX bandpass filter 58 receives and filters the second RF TDD TX signal TTS to provide a second filtered RF TDD TX signal FTTS. In one embodiment of the RF bandpass filter circuitry 48, the first FDD RF TX bandpass filter 60 receives and filters the first RF FDD TX signal FTF to provide a first filtered RF FDD TX signal FFTF. In one embodiment of the RF bandpass filter circuitry 48, the second FDD RF TX bandpass filter 62 receives and filters the second RF FDD TX signal FTS to provide a second filtered RF FDD TX signal FFTS.

In one embodiment of the RF bandpass filter circuitry 48, during the first TDD TX operating mode, the first TDD RF TX/RX bandpass filter 56 receives, filters, and transmits the first RF TDD TX signal TTF. In one embodiment of the RF bandpass filter circuitry 48, during the second TDD TX operating mode, the second TDD RF TX/RX bandpass filter 58 receives, filters, and transmits the second RF TDD TX signal TTS.

In one embodiment of the RF antenna switching circuitry 50, the RF antenna switching circuitry 50 forwards and transmits the first filtered RF TDD TX signal FTTF via a selected one of the first common connection node CN1 and the second common connection node CN2 based on the first function configuration signal FCS1. In one embodiment of the RF antenna switching circuitry 50, the RF antenna switching circuitry 50 forwards and transmits the second filtered RF TDD TX signal FTTS via a selected one of the first common connection node CN1 and the second common connection node CN2 based on the first function configuration signal FCS1.

In one embodiment of the RF antenna switching circuitry 50, the RF antenna switching circuitry 50 forwards and transmits the first filtered RF FDD TX signal FFTF via a selected one of the first common connection node CN1 and the second common connection node CN2 based on the first function configuration signal FCS1. In one embodiment of the RF antenna switching circuitry 50, the RF antenna switching circuitry 50 forwards and transmits the second filtered RF FDD TX signal FFTS via a selected one of the first common connection node CN1 and the second common connection node CN2 based on the first function configuration signal FCS1.

FIG. 5 shows the RF communications circuitry 10 according to another embodiment of the RF communications circuitry 10. The RF communications circuitry 10 illustrated in FIG. 5 is similar to the RF communications circuitry 10 illustrated in FIG. 2, except the RF communications circuitry 10 illustrated in FIG. 5 shows details of the RF RX circuitry 20 and the RF TX circuitry 22. As such, the RF RX circuitry 20 includes a first FDD RF LNA 64, a second FDD RF LNA 66, a first TDD RF LNA 68, and a second TDD RF LNA 70. The RF TX circuitry 22 includes the RF PA 72.

In one embodiment of the RF RX circuitry 20, the first FDD RF LNA 64 receives and amplifies the first filtered RF FDD RX signal FFRF to provide the first processed RF FDD RX signal PFRF. The second FDD RF LNA 66 receives and amplifies the second filtered RF FDD RX signal FFRS to provide the second processed RF FDD RX signal PFRS. The first TDD RF LNA 68 receives and amplifies the first forwarded RF TDD RX signal WTRF to provide the first processed RF TDD RX signal PTRF. The second TDD RF LNA 70 receives and amplifies the second forwarded RF TDD RX signal WTRS to provide the second processed RF TDD RX signal PTRS. In one embodiment of the RF TX circuitry 22, the RF PA 72 receives and amplifies the RF input signal RFN to provide the RF TX signal RFT.

In one embodiment of the RF communications circuitry 10, during the first CA FDD-TDD operating mode, the RF TDD switching circuitry 26 forwards the first filtered RF TDD RX signal FTRF to provide the first forwarded RF TDD RX signal WTRF. In one embodiment of the RF communications circuitry 10, during the second CA FDD-TDD operating mode, the RF TDD switching circuitry 26 forwards the second filtered RF TDD RX signal FTRS to provide the second forwarded RF TDD RX signal WTRS.

In one embodiment of the RF communications circuitry 10, during the first CA FDD-TDD operating mode, the first TDD RF LNA 68 receives and amplifies the first forwarded RF TDD RX signal WTRF to provide the first processed RF TDD RX signal PTRF. In one embodiment of the RF communications circuitry 10, during the second CA FDD-TDD operating mode, the second TDD RF LNA 70 receives and amplifies the second forwarded RF TDD RX signal WTRS to provide the second processed RF TDD RX signal PTRS.

Some of the circuitry previously described may use discrete circuitry, integrated circuitry, programmable circuitry, non-volatile circuitry, volatile circuitry, software executing instructions on computing hardware, firmware executing instructions on computing hardware, the like, or any combination thereof. The computing hardware may include mainframes, micro-processors, micro-controllers, DSPs, the like, or any combination thereof.

None of the embodiments of the present disclosure are intended to limit the scope of any other embodiment of the present disclosure. Any or all of any embodiment of the present disclosure may be combined with any or all of any other embodiment of the present disclosure to create new embodiments of the present disclosure.

Those skilled in the art will recognize improvements and modifications to the preferred embodiments of the present disclosure. All such improvements and modifications are considered within the scope of the concepts disclosed herein and the claims that follow.

What is claimed is:

1. Radio Frequency (RF) circuitry configured to operate in one of a plurality of operating modes, and comprising:
   RF receive (RX) circuitry;
   an RF power amplifier (PA) configured to receive and amplify an RF input signal to provide an RF transmit (TX) signal, wherein:
      the plurality of operating modes comprises a first carrier aggregation (CA) frequency-division duplexing (FDD)-time-division duplexing (TDD) operating mode and a first TDD TX operating mode;
      during the first CA FDD-TDD operating mode, the RF TX signal has a first FDD TX carrier frequency; and
      during the first TDD TX operating mode, the RF TX signal has a first TDD TX carrier frequency;
   RF TDD switching circuitry configured to during the first CA FDD-TDD operating mode:
      forward a first filtered RF TDD RX signal to the RF RX circuitry; and
      provide greater than 30 decibels (dB) of isolation between RF TX switching circuitry and the RF RX circuitry; and
   the RF TX switching circuitry coupled between the RF PA and the RF TDD switching circuitry, and configured to:
      during the first CA FDD-TDD operating mode, provide greater than 30 dB of isolation between the RF PA and the RF TDD switching circuitry; and
      during the first TDD TX operating mode, forward the RF TX signal to the RF TDD switching circuitry.

2. The RF circuitry of claim 1 further comprising a configurable RF TX/RX multiplexer, wherein:
   the RF TDD switching circuitry comprises a first TDD RX switching element and a first TDD TX switching element;
   the RF TX switching circuitry comprises a master TDD TX switching element and a first FDD TX switching element;
   the first TDD RX switching element is coupled between the configurable RF TX/RX multiplexer and the RF RX circuitry;
   the first TDD TX switching element is coupled between the configurable RF TX/RX multiplexer and the master TDD TX switching element;
   the master TDD TX switching element is coupled between the first TDD TX switching element and the RF PA; and
   the first FDD TX switching element is coupled between the configurable RF TX/RX multiplexer and the RF PA.

3. The RF circuitry of claim 2 wherein each of the first TDD RX switching element, the first TDD TX switching element, the master TDD TX switching element, and the first FDD TX switching element is configured to be one of ON and OFF based on a first function configuration signal.

4. The RF circuitry of claim 3 further comprising RF system control circuitry configured to select the one of ON and OFF of each of the first TDD RX switching element, the first TDD TX switching element, the master TDD TX switching element, and the first FDD TX switching element using the first function configuration signal.

5. The RF circuitry of claim 3 wherein:
during the first TDD TX operating mode; the master TDD TX switching element is configured to be ON, the first FDD TX switching element is configured to be OFF, the first TDD RX switching element is configured to be OFF, and the first TDD TX switching element is configured to be ON; and
during the first CA FDD-TDD operating mode; the master TDD TX switching element is configured to be OFF, the first FDD TX switching element is configured to be ON, the first TDD RX switching element is configured to be ON, and the first TDD TX switching element is configured to be OFF.

6. The RF circuitry of claim 1 wherein the RF TDD switching circuitry is further configured to during the first CA FDD-TDD operating mode, forward the first filtered RF TDD RX signal to provide a first forwarded RF TDD RX signal; and the RF RX circuitry comprises a low noise amplifier (LNA) configured to during the first CA FDD-TDD operating mode, receive and amplify the first forwarded RF TDD RX signal.

7. The RF circuitry of claim 1 further comprising a configurable RF TX/RX multiplexer, wherein:
during the first TDD TX operating mode, the RF TDD switching circuitry is further configured to provide a first RF TDD TX signal based on the RF TX signal and the configurable RF TX/RX multiplexer is configured to receive, filter, and transmit the first RF TDD TX signal via an RF antenna; and
during the first CA FDD-TDD operating mode, the RF TX switching circuitry is further configured to provide a first RF FDD TX signal based on the RF TX signal and the configurable RF TX/RX multiplexer is further configured to receive, filter, and transmit the first RF FDD TX signal via an RF antenna.

8. The RF circuitry of claim 7 wherein the configurable RF TX/RX multiplexer comprises a first TDD RF TX/RX bandpass filter configured to:
during the first TDD TX operating mode, receive, filter, and transmit the first RF TDD TX signal; and
during the first CA FDD-TDD operating mode, receive and filter an RF receive signal via an RF antenna to provide the first filtered RF TDD RX signal.

9. The RF circuitry of claim 1 further comprising a configurable RF TX/RX multiplexer, wherein:
the plurality of operating modes further comprises a first TDD RX operating mode; and
during the first CA FDD-TDD operating mode and during the first TDD RX operating mode, the configurable RF TX/RX multiplexer is configured to receive and filter a first RF receive signal via an RF antenna to provide the first filtered RF TDD RX signal to the RF TDD switching circuitry.

10. The RF circuitry of claim 9 wherein:
the RF TDD switching circuitry comprises a first TDD RX switching element coupled between the configurable RF TX/RX multiplexer and the RF RX circuitry;
the RF TDD switching circuitry further comprises a first TDD TX switching element coupled between the configurable RF TX/RX multiplexer and the RF TX switching circuitry;
during the first CA FDD-TDD operating mode and during the first TDD RX operating mode, the first TDD RX switching element is configured to be ON and the first TDD TX switching element is configured to be OFF; and during the first TDD TX operating mode, the first TDD RX switching element is configured to be OFF and the first TDD TX switching element is configured to be ON.

11. The RF circuitry of claim 9 wherein during the first CA FDD-TDD operating mode, the configurable RF TX/RX multiplexer is further configured to receive and filter a second RF receive signal via an RF antenna to provide a first filtered RF FDD RX signal to the RF RX circuitry.

12. The RF circuitry of claim 11 wherein during the first CA FDD-TDD operating mode, the RF circuitry is further configured to provide RX downlink carrier aggregation (RXDLCA), such that the first filtered RF FDD RX signal and the first filtered RF TDD RX signal are RXDLCA signals and are configured to be received simultaneously.

13. The RF circuitry of claim 1 wherein:
the first filtered RF TDD RX signal is configured to have a first TDD RX carrier frequency;
the first TDD RX carrier frequency is between 2300 megahertz and 2400 megahertz;
the first TDD TX carrier frequency is between 2300 megahertz and 2400 megahertz; and
the first FDD TX carrier frequency is between 2500 megahertz and 2570 megahertz.

14. The RF circuitry of claim 1 wherein the plurality of operating modes further comprises:
a plurality of TDD RX operating modes;
a plurality of TDD TX operating modes, which comprises the first TDD TX operating mode; and
a plurality of CA FDD-TDD operating modes, which comprises the first CA FDD-TDD operating mode.

15. The RF circuitry of claim 14 wherein the plurality of operating modes further comprises:
a plurality of FDD operating modes; and
a plurality of CA FDD operating modes.

16. The RF circuitry of claim 1 further comprising RF bandpass filter circuitry, wherein:
the RF TDD switching circuitry comprises a plurality of TDD TX switching elements and a plurality of TDD RX switching elements;
the RF TX switching circuitry comprises a plurality of FDD TX switching elements;
each of the plurality of TDD TX switching elements is coupled between the RF TX switching circuitry and the RF bandpass filter circuitry;
each of the plurality of TDD RX switching elements is coupled between the RF RX circuitry and the RF bandpass filter circuitry; and
the plurality of FDD TX switching elements is coupled between the RF PA and the RF bandpass filter circuitry.

17. The RF circuitry of claim 16 further comprising a first switching circuitry die and a second switching circuitry die, wherein:
the first switching circuitry die comprises the plurality of FDD TX switching elements;
the second switching circuitry die comprises the plurality of TDD TX switching elements and the plurality of TDD RX switching elements;
each of the plurality of FDD TX switching elements has a design life of a first number of actuations;
each of the plurality of TDD TX switching elements has a design life of a second number of actuations;
each of the plurality of TDD RX switching elements has a design life of a third number of actuations;
the second number is greater than ten times the first number; and
the third number is greater than ten times the first number.

18. The RF circuitry of claim 17 wherein:
each of the plurality of FDD TX switching elements is a micro-electromechanical systems (MEMS) switching element;
each of the plurality of TDD TX switching elements is a silicon-on-insulator (SOI) switching element; and
each of the plurality of TDD RX switching elements is an SOI switching element.

* * * * *